US012613776B2

(12) United States Patent
Estep et al.

(10) Patent No.: US 12,613,776 B2
(45) Date of Patent: Apr. 28, 2026

(54) PARITY CACHE FOR RAID RELIABILITY, ACCESSIBILITY, AND SERVICEABILITY OF A MEMORY DEVICE

(71) Applicant: Micron Technology, Inc., Boise, ID (US)

(72) Inventors: Patrick Estep, Boise, ID (US); Stephen Pawlowski, Boise, ID (US); Emanuele Confalonieri, Boise, ID (US); Nicola Del Gatto, Boise, ID (US); Paolo Amato, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/897,048

(22) Filed: Aug. 26, 2022

(65) Prior Publication Data

US 2023/0229556 A1     Jul. 20, 2023

Related U.S. Application Data

(60) Provisional application No. 63/301,021, filed on Jan. 19, 2022.

(51) Int. Cl.
G06F 11/00        (2006.01)
G06F 11/10        (2006.01)

(52) U.S. Cl.
CPC .. G06F 11/1076 (2013.01); G06F 2211/1009 (2013.01)

(58) Field of Classification Search
CPC ......... G06F 11/1076; G06F 2211/1009; G06F 3/0659; G06F 3/061; G06F 11/1096; G06F 3/0656
See application file for complete search history.

(56) References Cited

U.S. PATENT DOCUMENTS

| | | | | |
|---|---|---|---|---|
| 5,341,381 A * | 8/1994 | Fuller | ................. | G06F 11/1076 |
| | | | | 711/E12.019 |
| 5,640,531 A * | 6/1997 | Whittaker | ........... | G06F 12/0835 |
| | | | | 711/119 |
| 5,829,038 A * | 10/1998 | Merrell | ............... | G06F 12/0811 |
| | | | | 711/143 |
| 5,860,090 A * | 1/1999 | Clark | .................. | G06F 11/1076 |
| | | | | 711/112 |
| 6,460,122 B1 * | 10/2002 | Otterness | ............ | G06F 12/0866 |
| | | | | 711/E12.024 |
| 7,051,156 B2 * | 5/2006 | Shang | ................. | G06F 12/0866 |
| | | | | 714/6.24 |
| 7,370,148 B2 * | 5/2008 | Ikeuchi | ............... | G06F 11/1076 |
| | | | | 711/143 |
| 7,426,611 B1 * | 9/2008 | Gupta | ................. | G06F 12/0897 |
| | | | | 711/119 |

(Continued)

*Primary Examiner* — Loan L. T. Truong
(74) *Attorney, Agent, or Firm* — Wood IP, LLC; Theodore A. Wood

(57)        ABSTRACT

There are provided methods and systems for improving RAS features of a memory device. For example, there is provided a system that includes a memory and a memory side cache. The system further includes a processor that is configured to minimize accesses to the memory by executing certain operations. The operations can include computing a new parity based on old data, new data, and an old parity in response to data from the memory side cache being written to the memory.

16 Claims, 3 Drawing Sheets

(56) References Cited

U.S. PATENT DOCUMENTS

| | | | |
|---|---|---|---|
| 8,533,393 B1 * | 9/2013 | Cote | H04L 67/5682 |
| | | | 711/171 |
| 9,323,617 B2 * | 4/2016 | Fuxa | G06F 11/1096 |
| 9,678,880 B1 * | 6/2017 | Korotaev | G06F 12/121 |
| 9,824,011 B2 * | 11/2017 | Lam | G06F 12/0817 |
| 10,261,907 B2 * | 4/2019 | Galbraith | G06F 12/0873 |
| 10,853,268 B2 * | 12/2020 | Imazaki | G06F 12/126 |
| 10,891,057 B1 * | 1/2021 | O'Brien, III | G06F 3/0688 |
| 2004/0088485 A1 * | 5/2004 | Shang | G06F 11/1076 |
| | | | 711/135 |
| 2006/0206752 A1 * | 9/2006 | Ikeuchi | G06F 11/1076 |
| | | | 714/E11.034 |
| 2011/0213925 A1 * | 9/2011 | Ledford | G06F 12/0802 |
| | | | 711/E12.019 |
| 2012/0173802 A1 * | 7/2012 | Iwamura | G11C 16/349 |
| | | | 711/E12.001 |
| 2013/0290613 A1 * | 10/2013 | Uehara | G06F 3/0688 |
| | | | 711/103 |
| 2016/0018995 A1 * | 1/2016 | Vadalamani | G06F 3/0656 |
| | | | 711/123 |
| 2018/0101441 A1 * | 4/2018 | Hyun | G06F 3/0665 |
| 2019/0026033 A1 * | 1/2019 | Simionescu | G06F 11/1076 |

* cited by examiner

100

200

201          203          205

PARITY CACHE FOR RAID RELIABILITY, ACCESSIBILITY, AND SERVICEABILITY OF A MEMORY DEVICE

CROSS-REFERENCE TO RELATED APPLICATION

This application claims priority to U.S. Provisional Application No. 63/301,021 filed on Jan. 19, 2022, titled "Parity cache for RAID RAS", which is hereby expressly incorporated herein by reference in its entirety.

FIELD OF TECHNOLOGY

This disclosure relates generally to one or more systems and methods for memory, particularly to improved reliability, accessibility, and serviceability (RAS) in a memory device.

BACKGROUND

Memory devices deploy a variety of mechanisms to improve RAS features in cases of component failures. Although the use of redundant array of independent disks (RAID) as a RAS solution has traditionally been reserved for storage devices, there are compelling performance reasons to consider the use of RAID protocols as part of a RAS solution for memory devices as well.

For instance, a RAID 5 RAS solution for a memory device would achieve a high level of parallelism when compared with other RAS approaches due to striping data across the memory device channels. However, using RAID in this manner can result in significant increases in the number of requests serviced by the memory device due to the overhead of reading and writing data to calculate and store parity data. As such, utilizing RAID to improve RAS features of a memory device is not practical in the state-of-the-art.

SUMMARY

The embodiments provided herein help mitigate or solve the aforementioned issues as well as other issues known in the art. For example, and not by limitation, they provide a separate parity cache that is deployed as a last level cache on a memory device. The usage of this parity cache along with specific optimizations in the data access patterns for calculating and storing parity data result in significant decreases in the overhead resulting from the RAID RAS solution as it applies to the memory, thus making this implementation suitable for applications that require high-bandwidth access for read/write operations, such as in novel compute express link (CXL) applications.

An example embodiment includes a system that includes a memory and a memory side cache. The system further includes a processor that is configured to minimize accesses to the memory by executing certain operations. The operations can include computing a new parity based on old data, new data, and an old parity in response to data from the memory side cache being written to the memory.

Another example embodiment includes a method for use by a memory controller of a memory. The method can include determining whether data from a memory side cache has been written to the memory. Furthermore, in response to the data having been written in the memory, the method can include computing a new parity using old data, new data, and an old parity.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

An example embodiment provides for a separate parity cache that is deployed as a last level cache on a memory device. Use of this parity cache along with specific optimizations in the data access patterns for calculating and storing parity data can result in significant decreases in the overhead resulting from RAID RAS solutions.

Figure 1:
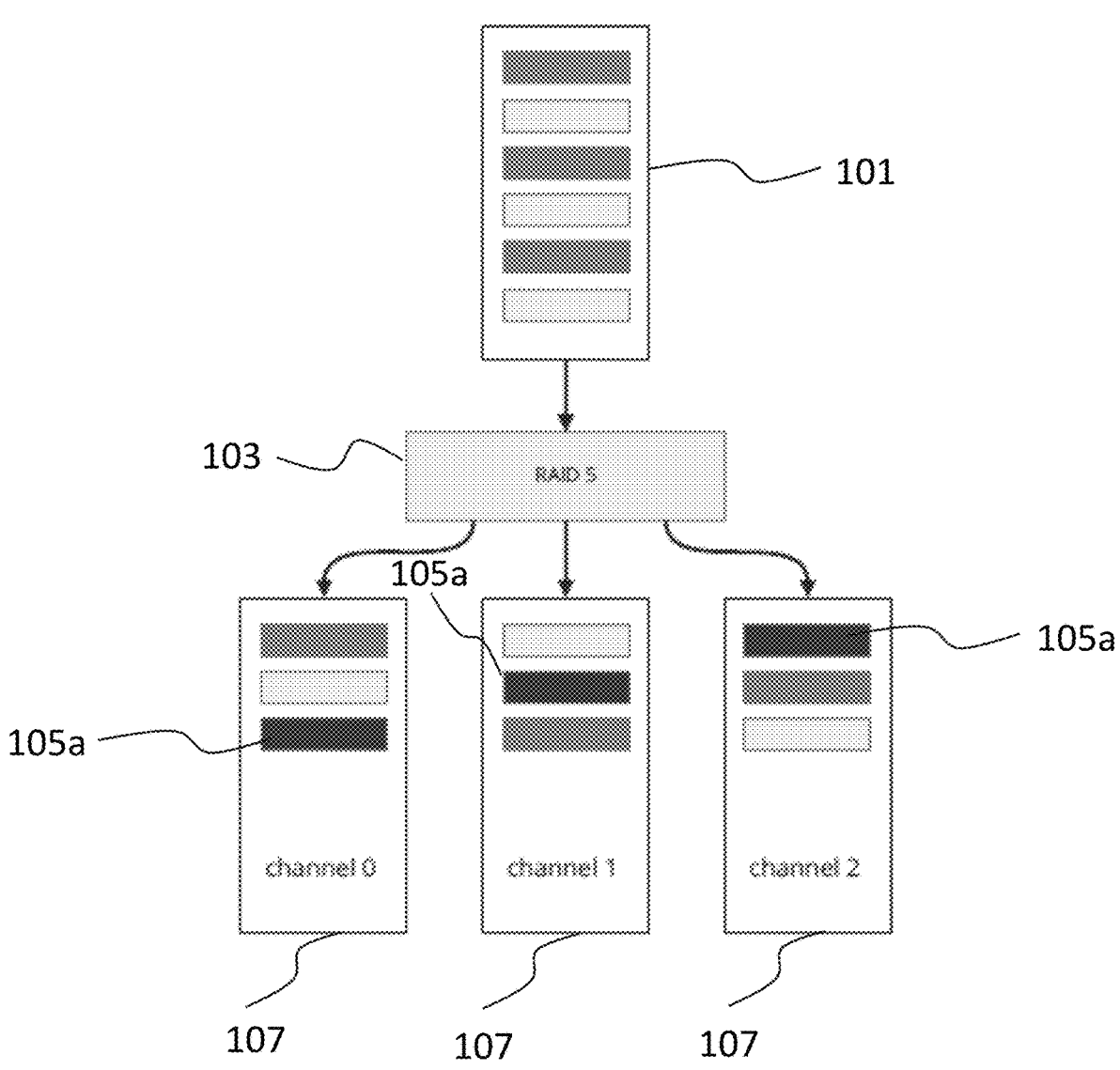
FIG. 1 illustrates a RAID scheme according to an embodiment.

FIG. 1 illustrates a RAID system 100 according to an embodiment. For example, and without limitation, the RAID system 100 may be a RAID 5 controller. In this example configuration, data included in a data cache 101 is fetched by a RAID 5 controller 103. The data is striped and stored onto all but one channel (105a) of each redundant storage area 107. The last channel stores parity data for that stripe, for redundancy purposes. Which channels are used for data or parity alternates may alternate for each stripe. When used with a memory, the embodiment includes a memory side cache that performs traditional caching for data accesses to and from the memory device.

When data from the memory side cache is written to the memory device, a new parity value is calculated. In order to avoid reading from every channel, for example, and not by limitation, the following operation is used to calculate the new parity value: new parity=old data XOR new data XOR old parity. One of ordinary skill in the art will readily recognize that the new parity value can be calculated using other operations that are based on the old data, the new data, and the old parity, without departing from the scope of the example embodiments disclosed herein.

The above noted operation includes at most two reads and two writes. They are a read old data, a read of the old parity, and after the new parity is calculated, a write of the new data, and a write of the new parity. The new parity, which will be the old parity of after subsequent data updates, is saved in a dedicated parity cache between the memory side cache and the memory device.

Figure 2:
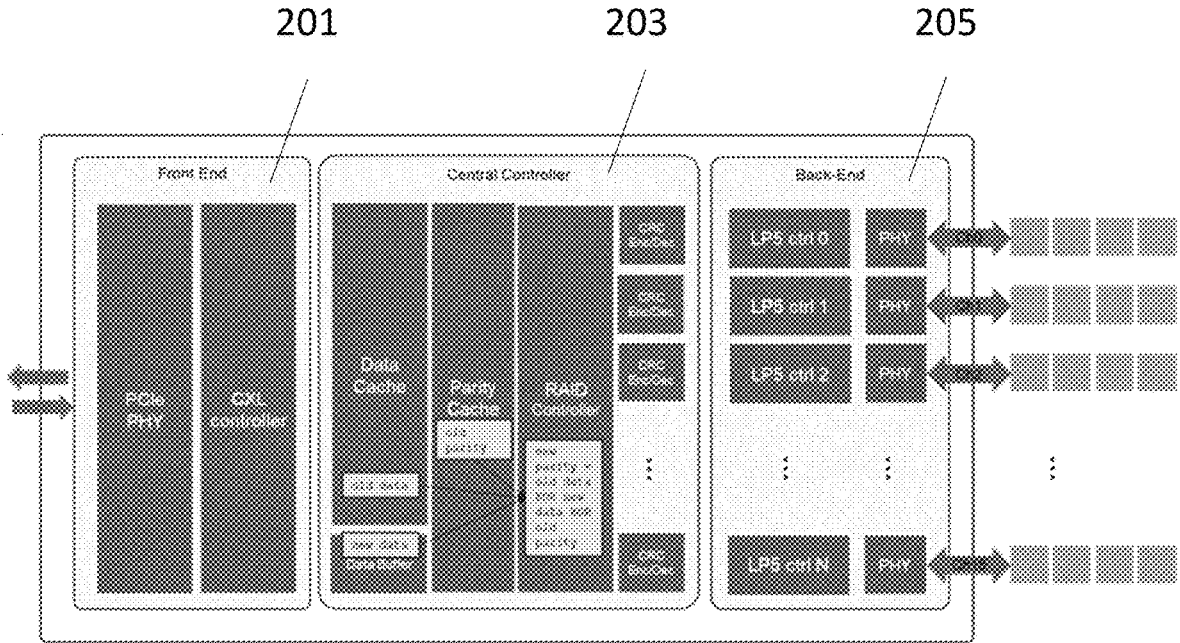
FIG. 2 illustrates a memory device architecture according to an embodiment.

FIG. 2 illustrates an exemplary memory device 200 according to an embodiment. The device 200 may include a front-end 201, which may include PCIe and/or CXL controllers to allow connectivity of the memory with other components in a larger system. The device 200 may further include a controller 203 with subcomponents that include a data cache, a parity cache, and a RAID controller, and bank of CRC encoding/decoding blocks that are configured to verify data integrity. The device 200 may further include a back-end 205 that is configured provide controllability and interfacing capabilities to physical layers such as a memory array.

Generally, the device 200 may be in the form of digital logic hardware capable of receiving, transmitting, and effecting calculations on digital data. For example, and without limitation, a parity calculation as effected in the controller 203 may be as follows. For every update to data in the memory side cache, the controller 203, which may be referred to as a process, can determine whether a cacheline for this data update is not already in the parity cache. If not, the cacheline is brought into the parity cacheline.

Before overwriting the cacheline, the processor may be configured to update the parity and then read the old parity value. The new parity value is then calculated as described above and the new parity value is written into the parity cache. With this approach, when a dirty line is evicted from the memory side cache, the parity value has already been calculated and written to the parity cache.

Figure 3:
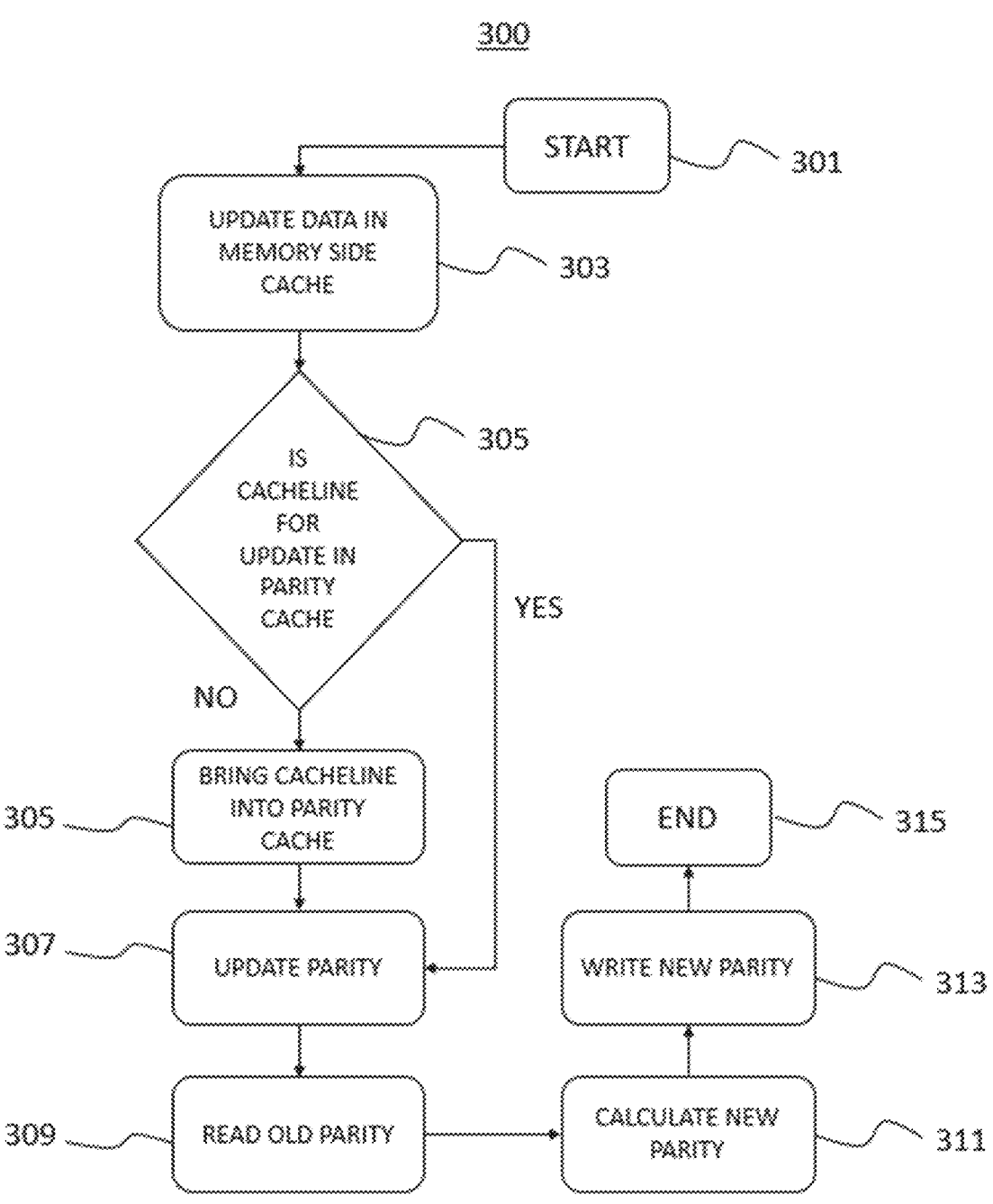
FIG. 3 illustrates a method according to an embodiment.

FIG. 3 illustrates a method 300 that may be executed by the controller 203 described above and in reference to FIG. 2. The method 300 begins at step 301, and it includes receiving a data update (step 303). Upon receipt, at decision block 305, the controller 203 is configured to determine whether a cacheline for the update is already in the parity cache. If yes, the method 300 proceeds to step 307. If not, the cacheline for the update is brought into the parity cache at step 305. At step 307, the parity is updated in the parity cache. Then, the controller 203 is configured to read the old parity (step 309), and the new parity is calculated as described above (step 311). The new parity is then written into the parity cache at step 313, and the method 300 ends at step 315, until it is executed again for a new data update.

A common application access pattern can have very high write hit rates (e.g., in cases of read-modify-write). As a result, the old data needed is frequently already in the memory side cache. Furthermore, data access patterns where a cacheline is modified multiple times before it is evicted are also common. In these cases, the old parity value is frequently in the RAID parity cache. Therefore, the old parity value needed is frequently already in the parity cache. Utilizing memory traces from a variety of applications, experimental results that utilize the novel architecture and scheme of this embodiment have yielded at least a 20% reduction in the amount of data transferred to/from memory device with a parity cache that is sized about ⅛th as big as the memory side cache. As such, generally, the parity cache can be smaller than the memory side cache, suggesting that the embodiments do not significantly increase overall device complexity.

Generally, the embodiments presented herein provide hardware and software solutions from improving RAS features of a memory device without compromising speed. Specifically, the embodiments provide a significant reduction in the amount of memory data transferred when using RAID as part of a memory device RAS solution. This reduction in overhead enables the use of a RAID RAS solution which brings excellent memory device parallelism due to striping the data across all the channels of the memory device.

For example, and without limitation, there is provided a system that includes a memory and a memory side cache. The system further includes a processor that is configured to minimize accesses to the memory by executing certain operations. The operations can include computing a new parity based on old data, new data, and an old parity in response to data from the memory side cache being written to the memory. Computing the new parity can include an exclusive OR (XOR) operation. More particularly, computing the new parity can include computing the old data exclusive ORed with the new data exclusive ORed with the old parity. The processor may be further configured is configured to compute the new parity without reading from every channel of the memory.

The processor may be configured to compute the new parity with at most two memory reads and at most two memory writes, and the system may further include a dedicated parity cache to save the new parity for subsequent use. The operations may further include detecting an update in the data in the memory side cache and determining whether a cacheline for the update is not in the memory side cache. Furthermore, in response to the cacheline being absent from the memory side cache, the operations can further include writing the cacheline into the memory side cache, updating the parity before overwriting the cacheline, and writing the new parity value to the memory side cache.

Another example embodiment includes a method for use by a memory controller of a memory. The method can include determining whether data from a memory side cache has been written to the memory. Furthermore, in response to the data having been written in the memory, the method can include computing a new parity using old data, new data, and an old parity.

The method can further include computing the new parity includes an exclusive OR (XOR) operation. More particularly, the method can include computing the new parity includes using the old data exclusive ORed with the new data exclusive ORed with the old parity. The method may further comprise computing the new parity without reading from every channel of the memory. The method can further include computing the new parity with at most two memory reads and at most two memory writes, and it can include saving parity information in a dedicated.

Furthermore, the method can include detecting an update in the data in the memory side cache and determining whether a cacheline for the update is not in the memory side cache. Moreover, in response to the cacheline being absent from the memory side cache, writing the cacheline into the memory side cache. The method can further include updating the parity before overwriting the cacheline and reading the old parity value. The method can further include writing the new parity value to the memory side cache.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, comprising:

a memory device;

a memory side cache configured for storing frequently accessed data and corresponding parity data to increase data read and write operations to and from the memory device;

a parity cache configured for storing a new parity data, wherein the parity cache is located between the memory side cache and the memory device such that the parity cache is deployed as a separate, last level cache on the memory device; and a processor configured to minimize access to the memory device by executing operations including:

(i) for every data update to the memory side cache, the system determines whether or not a cacheline for the data update is already in the parity cache;

(ii) when the cacheline for the data update is not already in the parity cache, the cacheline is brought into the parity cache, the system reads an old parity data, and computes the new parity data using old data, new data, and the old parity data;

(i) writes the new parity data only into the parity cache, wherein the parity cache is a single channel dedicated for all storage and subsequent access to the new parity data;

(iii) when the operations evict a dirty line from the memory side cache, the new parity data has already been calculated and written to the parity cache; and (iv) the parity cache and the memory side cache are configured to operate together to cause at least a 20% reduction in an amount of data transferred to and from the memory device with the parity cache that is sized approximately $\frac{1}{8}^{th}$ as big as the memory side cache.

2. The system of claim 1, wherein computing the new parity includes an exclusive OR (XOR) operation.

3. The system of claim 1, wherein computing the new parity includes computing the old data exclusive ORed with the new data exclusive ORed with the old parity.

4. The system of claim 1, wherein the processor is configured to compute the new parity without reading from every channel of the memory device.

5. The system of claim 1, wherein the processor is configured to compute the new parity with at most two memory reads and at most two memory writes.

6. The system of claim 1, further including a dedicated parity cache.

7. The system of claim 1, wherein the operations further include:

detecting an update in the data in the memory side cache;

determining whether a cacheline for the update is not in the memory side cache; and in response to the cacheline being absent from the memory side cache, writing the cacheline into the memory side cache.

8. A method for use by a memory controller of a memory device, the method comprising:

storing frequently accessed data and corresponding parity data into a memory side cache to increase data read and write operations to and from the memory device;

storing new parity data into a parity cache, wherein the parity cache is located between the memory side cache and the memory device such that the parity cache is deployed as a separate, last level cache on a memory device;

for every data update to the memory side cache, determining whether or not a cacheline for the parity update is already in the parity cache;

when the cacheline for the data update is not already in the parity cache, the cacheline is brought into the parity cache, then reading an old parity data, and computing a new parity using old data, new data, and the old parity;

writing the new parity data only into the parity cache, wherein the parity cache is a single channel dedicated for all storage and subsequent access to the new parity data;

when evicting a dirty line from the memory side cache, the new parity data has already been calculated and written to the parity cache; and operating together the parity cache and the memory side cache to cause at least a 20% reduction in an amount of data transferred to and from the memory device with the parity cache that is sized approximately $\frac{1}{8}^{th}$ as big as the memory side cache.

9. The method of claim 8, wherein computing the new parity includes an exclusive OR (XOR) operation.

10. The method of claim 8, wherein computing the new parity includes computing the old data exclusive ORed with the new data exclusive ORed with the old parity.

11. The method of claim 8, further comprising computing the new parity without reading from every channel of the memory device.

12. The method of claim 8, further comprising computing the new parity with at most two memory reads and at most two memory writes.

13. The method of claim 8, further including saving parity information in a dedicated parity cache.

14. The method of claim 8, further including:

detecting an update in the data in the memory side cache; and determining whether a cacheline for the update is not in the memory side cache.

15. The method of claim 14, further including:

in response to the cacheline being absent from the memory side cache, writing the cacheline into the memory side cache.

16. The method of claim 15, further comprising writing a new parity value to the memory side cache.

* * * * *